US012466963B2

(12) United States Patent
Viitanen et al.

(10) Patent No.: US 12,466,963 B2
(45) Date of Patent: Nov. 11, 2025

(54) TRANSPARENT VARNISH COMPOSITION

(71) Applicant: FP-Pigments Oy, Espoo (FI)

(72) Inventors: Jorma Viitanen, Espoo (FI); Katrine Nylund, Espoo (FI); Sami Haakana, Espoo (FI)

(73) Assignee: FP-Pigments Oy, Espoo (FI)

(*) Notice: Subject to any disclaimer, the term of this patent is extended or adjusted under 35 U.S.C. 154(b) by 956 days.

(21) Appl. No.: 17/436,686

(22) PCT Filed: Mar. 9, 2020

(86) PCT No.: PCT/FI2020/050146
§ 371 (c)(1),
(2) Date: Sep. 7, 2021

(87) PCT Pub. No.: WO2020/178487
PCT Pub. Date: Sep. 10, 2020

(65) Prior Publication Data
US 2022/0169870 A1    Jun. 2, 2022

(30) Foreign Application Priority Data
Mar. 7, 2019 (FI) ........................... 20195167

(51) Int. Cl.
C09D 7/61     (2018.01)
B05D 7/26     (2006.01)
(Continued)

(52) U.S. Cl.
CPC .............. C09D 7/61 (2018.01); B05D 7/26 (2013.01); C08K 3/26 (2013.01); C09D 7/67 (2018.01);
(Continued)

(58) Field of Classification Search
CPC ... C09D 7/61; C09D 7/67; C09D 7/68; C09D 5/00; C09D 133/02; C09D 175/04;
(Continued)

(56) References Cited

U.S. PATENT DOCUMENTS 9,284,422 B2    3/2016  Boucher et al.
2003/0175501 A1*  9/2003  Concannon .............. B41M 5/52
                                                                    428/323
(Continued)

FOREIGN PATENT DOCUMENTS

RU          2280115 C2       7/2006
WO     WO 2009009553 A1     1/2009
(Continued)

OTHER PUBLICATIONS

Tang et al: Influence of Particle Surface Properties on Film Formation from Precipitated Calcium Carbonate/Latex Blends. Journal of Applied Polymer Science, Aug. 14, 2014, vol. 86, pp. 891-900.

Primary Examiner — Mark Eashoo
Assistant Examiner — Cullen L G Davidson
(74) Attorney, Agent, or Firm — Laine IP Oy

(57) ABSTRACT

According to an example aspect of the present invention, there is provided a method of preparing a transparent varnish composition. The method comprises the steps of providing a binder, adding to the binder 1 to 40 wt % precipitated calcium carbonate particles by weight of the composition, wherein the precipitated calcium carbonate particles have an average $D_{50}$ particle size of 60 to 120 nm measured by dynamic light scattering, fewer than 10% of the precipitated calcium carbonate particles by volume of the total precipitated calcium carbonate particles have a particles size of 75 nm or less, fewer than 10% of the precipitated calcium carbonate particles by volume of the total precipitated calcium carbonate particles have a particles size of 110 nm or more, the steepness of the particle size distribution is in (Continued)

the range of 1.3-1.55, and dispersing the precipitated calcium carbonate in the composition.

22 Claims, 4 Drawing Sheets

(51) Int. Cl.
    *C08K 3/26*     (2006.01)
    *C09D 7/40*     (2018.01)

(52) U.S. Cl.
    CPC .......... *C09D 7/68* (2018.01); *C08K 2003/265* (2013.01); *C08K 2201/005* (2013.01); *C08K 2201/011* (2013.01)

(58) Field of Classification Search
    CPC ...... C09D 191/00; C09D 125/14; B05D 7/26; C08K 3/26; C08K 2003/265; C08K 2201/005; C08K 2201/011
    See application file for complete search history.

(56) References Cited

U.S. PATENT DOCUMENTS

| | | |
|---|---|---|
| 2005/0234178 A1 | 10/2005 | Andrews |
| 2006/0292305 A1 | 12/2006 | Skuse et al. |
| 2008/0227901 A1 | 9/2008 | Lefevre et al. |
| 2014/0065412 A1* | 3/2014 | Snare .................. C09D 7/67 106/286.6 |
| 2014/0272098 A1 | 9/2014 | Snare et al. |

FOREIGN PATENT DOCUMENTS

| | | |
|---|---|---|
| WO | WO 2010078071 A1 | 7/2010 |
| WO | WO 2012113876 A1 | 8/2012 |
| WO | WO 2014037623 A1 | 3/2014 |
| WO | WO 2018185371 A1 | 10/2018 |

\* cited by examiner

TRANSPARENT VARNISH COMPOSITION

FIELD

The present invention relates to a transparent varnish composition, a film coating formed from a transparent varnish composition, as well as processes for the preparation of the varnish composition and for the formation of a coating. Such a coating may be used on a solid substrate, e.g. on a plastic surface, a glass surface, a wood surface, a metal surface, a paper surface or a board surface.

BACKGROUND

Transparent film coatings are widely used for modifying surface properties of plastics, glass, wood, metal, paper and board. Coatings, in general, are particularly used to modify gloss, improve hardness, and modify the feel of a surface.

Conventionally, these mechanical properties are adjusted or modified by adding various additional components or additives to the composition. For example, in non-transparent coatings hardness and gloss are typically enhanced with fillers and pigments. Fillers are used in addition to conventional pigments in order to reduce costs, since pigments can be expensive.

Non-transparent coating formulations such as those disclosed in WO 201078071 A1 and in US 2005/0234178 A1 may contain nano-sized precipitated calcium carbonate (non-PCC). These formulations are manufactured by adding PCC agglomerates into water and mixing thoroughly to form a fluid slurry which is then dried to provide a composition with higher solids content before being applied as a coating onto a surface. These coatings have low transparency.

In transparent coatings it has typically been an aim to use little or no filler in order to maintain transparency. The gloss and hardness of such filler free coatings is adjusted with various additives resulting in difficult to handle complex formulations. Often the transparency of the coating is impaired. This problem was partially addressed in WO 2014/037623 which provides a transparent coating prepared from a coating mixture containing conventional coating components mixed with a coating slurry containing dispersed inorganic nanoparticles. The slurry is manufactured by dispersing nanoparticles or their agglomerates in a solvent by mechanical and or ultrasonic treatment.

SUMMARY OF THE INVENTION

It is an aim of the present invention to provide a novel varnish composition suitable for the formation of a transparent coating, and a method of preparation of such a coating.

In particular, it is an object of the present invention to provide a film coating formed from a transparent varnish composition as well as a method of forming a film coating on a substrate.

The invention is defined by the features of the independent claims. Some specific embodiments are defined in the dependent claims.

According to a first aspect of the present invention, there is provided a method of preparing a transparent varnish composition comprising the steps of providing a binder, adding to the binder 1 to 40 wt % CaCO3 by weight of the binder, wherein the CaCO3 has an average $D_{50}$ particle size of 60 to 120 nm measured by dynamic light scattering, fewer than 10% of the precipitated calcium carbonate particles by volume of the total precipitated calcium carbonate particles have a particles size of 75 nm or less, fewer than 10% of the precipitated calcium carbonate particles by volume of the total precipitated calcium carbonate particles have a particles size of 110 nm or more, the steepness of the particle size distribution is in the range of 1.3-1.55, and dispersing the CaCO3 in the composition.

According to a second aspect of the present invention, there is provided a transparent varnish composition comprising a binder, and 1 to 40 wt % by weight of the composition of precipitated calcium carbonate particles dispersed in the binder, wherein the precipitated calcium carbonate particles have an average $D_{50}$ particle size of 60 to 120 nm measured by dynamic light scattering, wherein fewer than 10% of the precipitated calcium carbonate particles by volume of the total precipitated calcium carbonate particles have a particles size of 75 nm or less, fewer than 10% of the precipitated calcium carbonate particles by volume of the total precipitated calcium carbonate particles have a particles size of 110 nm or more, and the steepness of the particle size distribution is in the range of 1.3-1.55.

According to a third aspect of the present invention, there is provided a film coating formed from a transparent varnish composition comprising a binder, and precipitated calcium carbonate. The coating has one or more of the following properties: a gloss value measured at 20° from the vertical using a gloss meter of about 1 to 60 gloss units, a gloss value measured at 60° from the vertical using a gloss meter of about 5 to 85 gloss units, a gloss value measured at 85° from the vertical using a gloss meter of about 30 to 100 gloss units.

According to a fourth aspect of the present invention, there is provided a method of forming a film coating on a substrate, comprising the steps of applying a varnish composition onto a surface of a solid substrate preferably on a surface of a solid substrate selected from the group consisting of plastic, glass, wood, paper, stone, artificial stone, glass fibre, fibreglass metal and board, to form a film coating.

According to a fifth aspect of the present invention, there is provided a transparent varnish composition obtainable by a method according to the second aspect of the present invention.

Considerable advantages are obtained by means of the invention. Thus, the present invention provides a transparent varnish composition comprising precipitated calcium carbonate particles that may be used to provide a transparent coating with modified gloss values as measured with a gloss metre at 20°, 60° and 85° from the vertical and superior mechanical properties. By means of the invention it has surprisingly been found that that by dispersing precipitated calcium carbonate particles having an average particle size distribution $D_{50}$ of 60 to 120 nm as measured by dynamic light scattering and a steepness of the particle size distribution in the range of 1.3-1.55 nm into a lacquer a varnish composition that may be used to provide a transparent coating with superior water vapour permeability, reduced swelling in or absorption of water, improved film blocking, scrub resistance, film hardness and/or a soft touch, in addition to the modified gloss values described above.

Next, embodiments will be described more closely with reference to the attached drawings and a detailed description.

EMBODIMENTS

Definitions

For the purposes of the present invention, the term "transparent" means that a varnish composition or film coating allows light to pass through so that objects behind can be distinctly seen, e.g. when peering into a tin of a varnish composition according to embodiments of the invention, the bottom of the tin can be seen, and when looking at a substrate coated with a film coating according to embodiments of the invention. The substrate and its physical features can clearly be seen under or behind the coating. The term "transparent" also includes "semi-transparent". A "semi-transparent" coating or composition is one which allows a light transmission of 70-90% of visible light having a wavelength of 400-800 nm, whereas a totally "transparent" coating or composition is one which allows >90% of visible light.

"Steepness of the particle size distribution" refers to the relationship between the particle sizes of 90% of the particles and 10% of the particles, e.g. if 90% of the particles have a particle size of 100 nm and 10% of the particles have a particle size of 70 nm, then the steepness of the particle size distribution is 100/70=1.43.

In the present context, the term "binder" means the film-forming component of a varnish composition and includes but is not limited to synthetic or natural resins such as alkyds, acrylics, vinyl-acrylics, styrene acrylic, vinyl acetate/ethylene, polyurethane, polyesters, melamine resins, epoxy, silanes, siloxanes and oils.

UFPCC shall be taken to mean ultrafine precipitated calcium carbonate. Ultrafine refers to particles having a mean particle diameter $D_{50}$ of less than or equal to 120 nm, particularly in the range of 60 to 120 nm, suitably in the range of 70 to 100 nm, preferably 80 to 90 nm.

L*D65=Brightness (scale 0 to 100, where 100 is max value for brightness).

a*D65=Red/Green shift, where a negative value indicates a green colour and a positive value indicates a red colour.

b*D65=Blue/Yellow shift, where a negative value indicates a blue colour and a positive value indicates a yellow colour.

Ry on white D65=reflectance on white when coating is measured on a white surface.

Ry on black D65=reflectance on black when coating is measured on a black surface.

In paragraphs 25 to 29 above, the term D65 refers to the light source used for the optical measurement.

Contrast Ratio=Ry on black/Ry on white. Contrast ratio is a measure of hiding power. A hiding power of 0% describes totally transparency. As hiding power increases, transparency decreases. In general, 98% is considered a fully opaque By means of embodiments of the present invention it has surprisingly been found that precipitated calcium carbonate, hereinafter PCC, particularly UFPCC, can be added into a binder in high doses to provide a novel transparent varnish composition. Transparency is maintained and water absorption, swelling and film blocking properties are all improved in a commercially valuable and attractive product.

Figure 1:
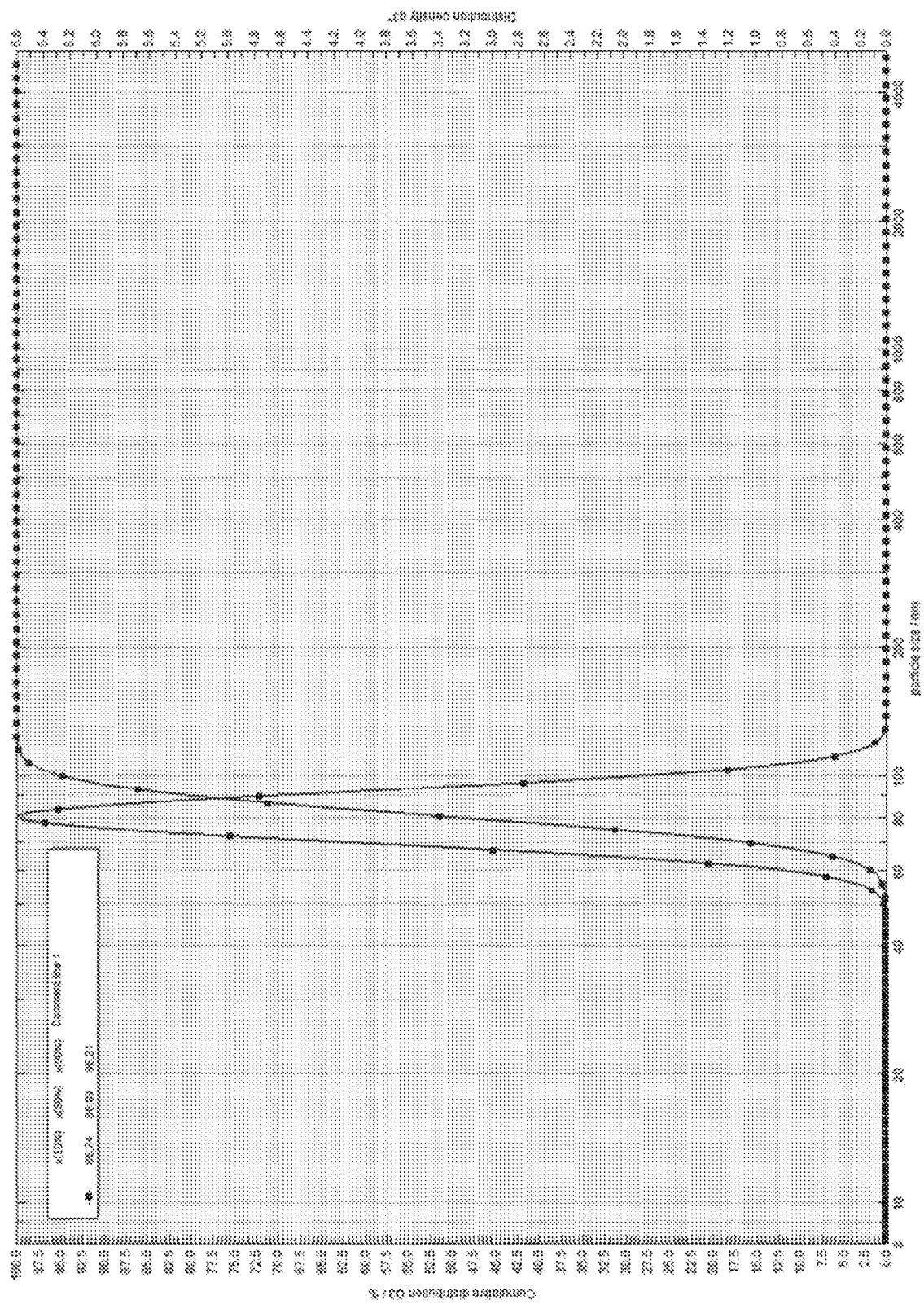
FIG. 1 is a particle size graph illustrating particle size distribution of precipitated calcium carbonate particles employed in compositions and coatings according to at least some embodiments of the present invention.

FIG. 1 is a particle size graph illustrating particle size distribution of precipitated calcium carbonate particles employed in compositions and coatings according to at least some embodiments of the present invention. The precipitated calcium carbonate particles have a steep distribution, i.e. the particles are of relatively uniform size. FIG. 1 describes that 10% by volume of the precipitated calcium carbonate particles have a particle size of less than 66.74 nm, 50% by volume of the precipitated calcium carbonate particles have a particle size of less than 80.09 nm, and 90% by volume of the precipitated calcium carbonate particles have particle size of less than 96.21 nm. This gives a steepness of particle size distribution of 1.44.

Figure 2:
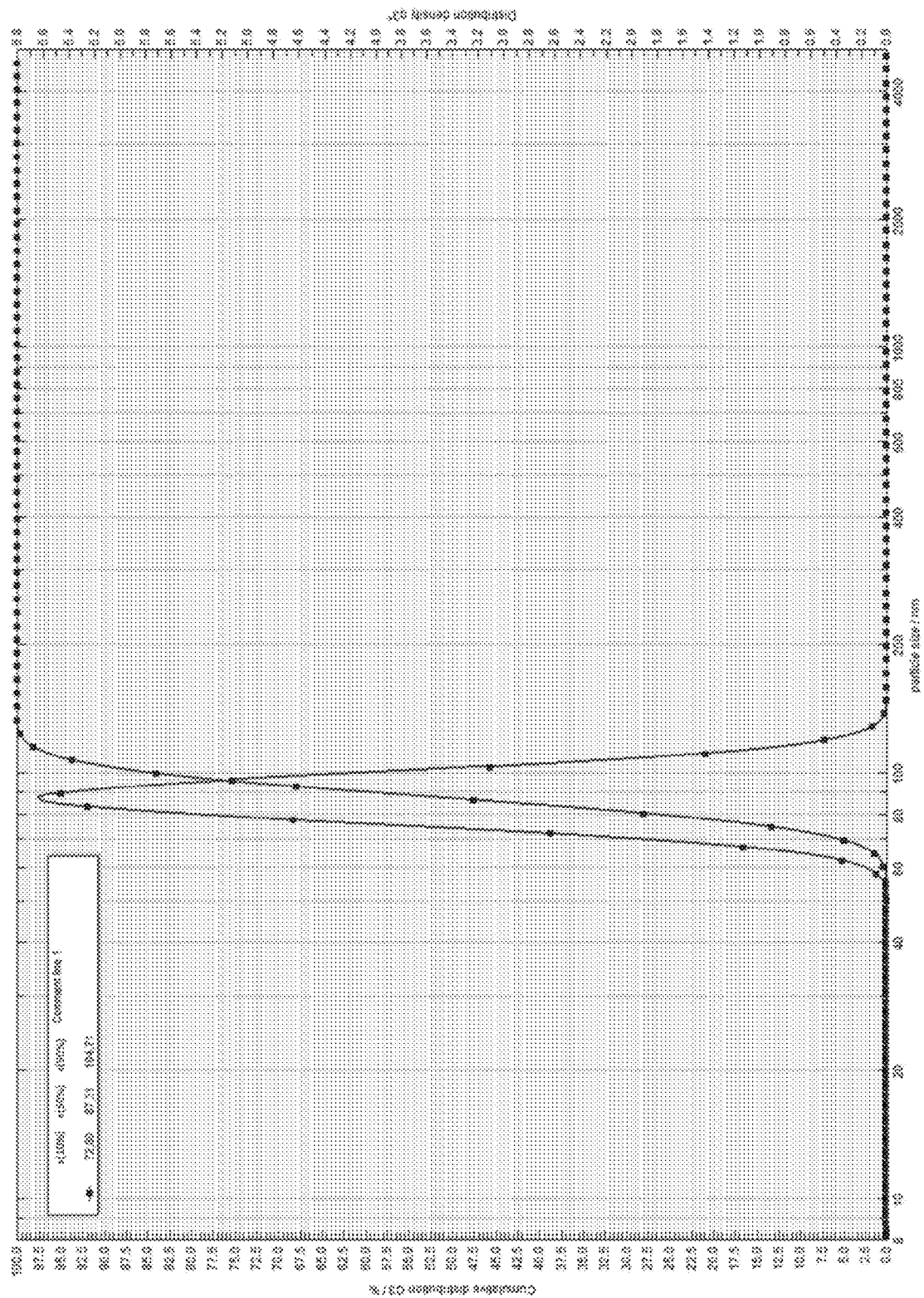
FIG. 2 is a particle size graph illustrating particle size distribution of precipitated calcium carbonate particles employed in compositions and coatings according to at least some embodiments of the present invention.

FIG. 2 is a particle size graph illustrating particle size distribution of precipitated calcium carbonate particles employed in compositions and coatings according to at least some embodiments of the present invention. The precipitated calcium carbonate particles have a steep distribution, i.e. the particles are of relatively uniform size. FIG. 1 describes that 10% by volume of the precipitated calcium carbonate particles have particle size of less than 72.8 nm, 50% by volume of the precipitated calcium carbonate particles have particle size of less than 87.31 nm, and 90% by volume of the precipitated calcium carbonate particles have particle size of less than 104.71 nm. This gives a steepness of particle size distribution of 1.44.

Figure 3:
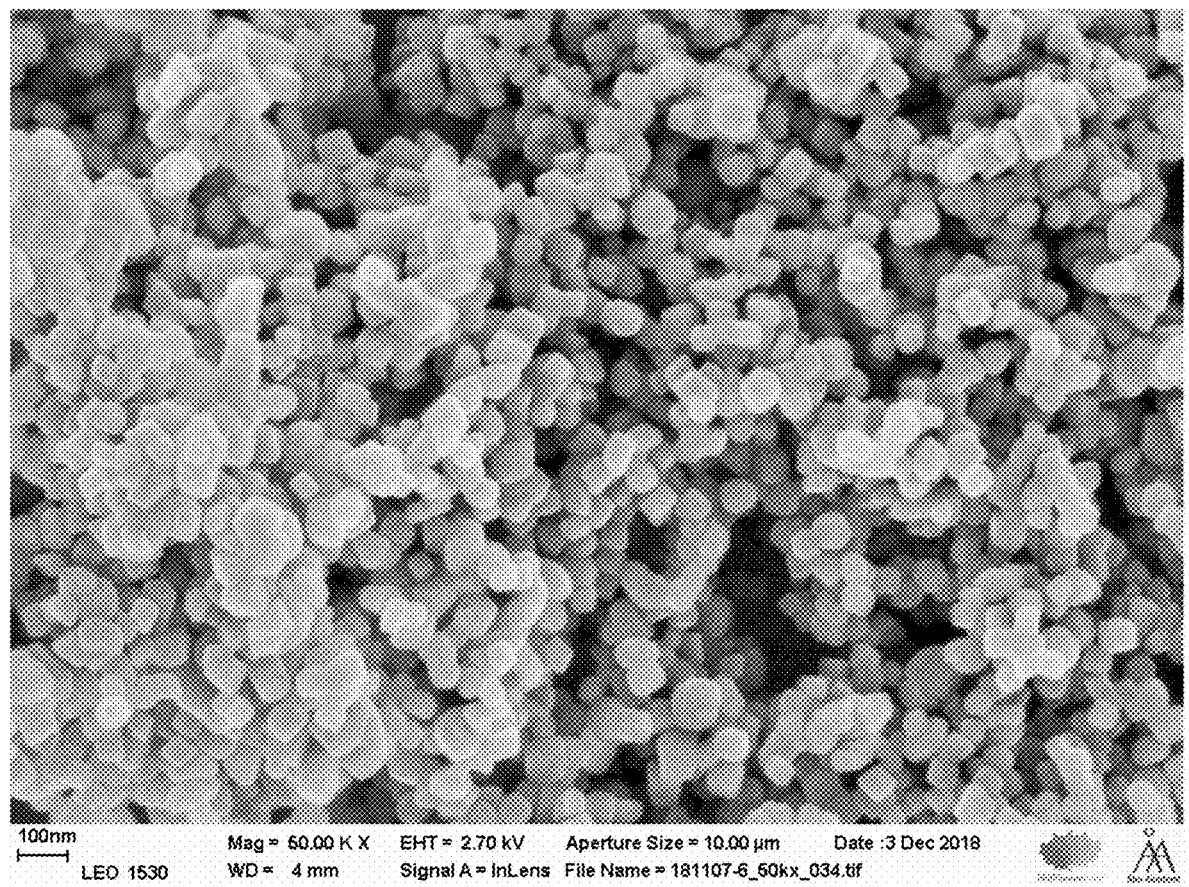
FIG. 3 is a scanning electronmicrograph of the precipitated calcium carbonate particles of FIG. 1, illustrating a uniform product.

FIG. 3 is a scanning electronmicrograph of the precipitated calcium carbonate particles of FIG. 1, illustrating a product of relatively uniform particle size. Although there are particles of various sizes present in the product, it is clear from the electronmicrograph that the nanosized calcium carbonate product consists of discrete particles where the particle size distribution is steep.

Figure 4A:
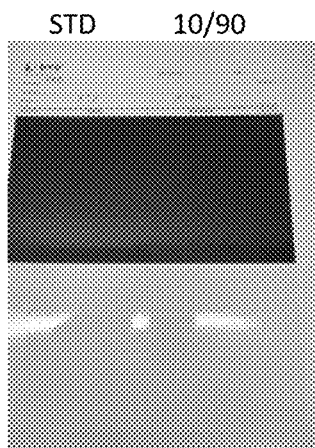
FIG. 4 shows a comparison of lacquer drawdowns comparing standard lacquers with varnish compositions according to at least some embodiments of the present invention.

FIG. 4A shows lacquer drawdowns comparing a standard lacquers with a varnish compositions comprising 10% by weight of UFPCC according to at least some embodiments of the present invention. The standard lacquer is shown on the left of the Figure and the varnish composition according to at least some embodiments of the present invention is shown on the right of the Figure.

Figure 4B:
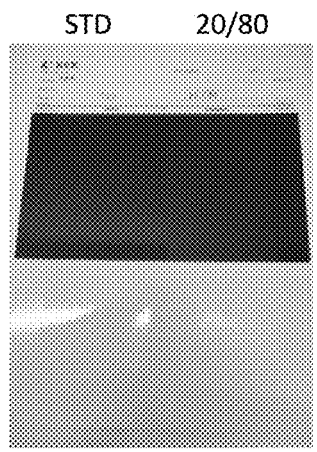

FIG. 4B shows lacquer drawdowns comparing a standard lacquers with a varnish compositions comprising 20% by weight of UFPCC according to at least some embodiments of the present invention. The standard lacquer is shown on the left of the Figure and the varnish composition according to at least some embodiments of the present invention is shown on the right of the Figure.

Figure 4C:
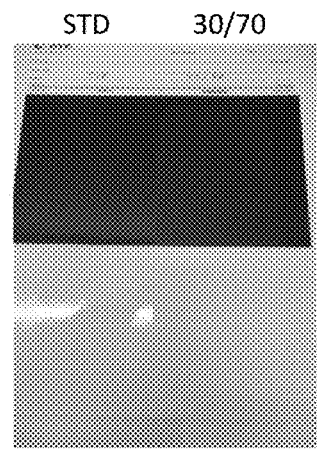

FIG. 4C shows lacquer drawdowns comparing a standard lacquers with a varnish compositions comprising 30% by weight of UFPCC according to at least some embodiments of the present invention. The standard lacquer is shown on the left of the Figure and the varnish composition according to at least some embodiments of the present invention is shown on the right of the Figure.

DETAILED DESCRIPTION

Varnish compositions may be prepared by methods according to embodiments of the present invention. According to an embodiment the method comprises the steps of providing a binder. As described above the binder is a film-forming component such as a synthetic or natural resin, for example an alkyd, and acrylic, a vinyl acrylic, a vinyl acetate/ethylene, a polyurethane, a polyester, a melamine resin, an epoxy, a silane, a siloxane or indeed an oil. The method further comprises adding to the binder 1 to 40 wt % precipitated calcium carbonate particles, such as UFPCC particles, by weight of the composition, wherein the precipitated calcium carbonate particles have an average D50 particle size of 60 to 120 nm measured by dynamic light scattering. Dynamic light scattering is a technique used to determine the size distribution profile of small particles in suspension. The technique involves illuminating a sample with a laser beam and detecting fluctuations of the scattered light. In an embodiment the dynamic light scattering techniques is carried out with a Sympatec unit having a laser beam that is split into two partial beams that intersect inside a sample cuvette. The unit has two detectors that receive information on from the two partial beams defining their intensities. A computer algorithm calculates the particle size based on these two signals and their differences. Fewer than 10% of the precipitated calcium carbonate particles by volume of the total precipitated calcium carbonate particles have a particles size of 75 nm or less, fewer than 10% of the precipitated calcium carbonate particles by volume of the total precipitated calcium carbonate particles have a particles size of 110 nm or more, and the steepness of the particle size distribution is in the range of 1.3-1.55. Such a steepness is indicative of a relatively uniform particle size. This steepness in conjunction with the ultrafineness of the particles allows for transparency of the composition to be maintained better than in compositions with a less steep particle size distribution. In compositions with a less steep particle size distribution, the particles tend to form agglomerates in the binder resulting in a decrease in transparency, in other words an increase in opacity. The method further comprises dispersing the precipitated calcium carbonate in the composition. In an embodiment the PCC is dispersed by mildly or gently agitating or mixing into the varnish composition. The mixing is mild or gentle so as to avoid foaming of the composition. In an embodiment mild or gentle mixing means that the PCC is stirred in with a spoon or equivalent tool.

In one embodiment the method further comprises the step of adding to the binder one or more conventional additives. Conventional additives are legion and in an embodiment may be selected from the group consisting of thickeners, bases, dispersants, coalescing agents, antifoaming agents, wetting agents, viscosity modifiers, film-forming agents, biocides and binders. In a further embodiment, the binder is selected from the group consisting of lacquer, styrene acrylic-based lacquer, acrylic-based lacquer, polyurethane-based lacquer and water-based wood oil. Each binder provides different properties e.g. when a particular application requires that the varnish composition should have particularly good water vapour permeability, a styrene acrylic based lacquer is preferred over a polyurethane-based lacquer. If the varnish composition is to be used in an application that must provide a particularly hard coating, a polyurethane lacquer is preferable to an acrylic-based lacquer which is in turn preferable to a styrene acrylic-based lacquer. Best film blocking is provided from a composition comprising a polyurethane lacquer, which is slightly better than an acrylic-based lacquer, which is slightly better than a styrene acrylic-based lacquer. In situations where low water absorption is imperative, a polyurethane lacquer is better than an acrylic-based lacquer, which is better than a styrene-acrylic based lacquer.

Further embodiments relate to a transparent varnish composition. In an embodiment the composition comprises a binder. As mentioned above. The composition further comprises 1 to 40 wt % by weight of the composition of precipitated calcium carbonate particles, such as UFPCC particles dispersed, e.g. by gentle mixing, in the binder, wherein the precipitated calcium carbonate particles have an average D50 particle size of 60 to 120 nm measured by dynamic light scattering. Dynamic light scattering is a technique used to determine the size distribution profile of small particles in suspension. The technique involves illuminating a sample with a laser beam and detecting fluctuations of the scattered light. Fewer than 10% of the precipitated calcium carbonate particles by volume of the total precipitated calcium carbonate particles have a particles size of 75 nm or less, fewer than 10% of the precipitated calcium carbonate particles by volume of the total precipitated calcium carbonate particles have a particles size of 110 nm or more, and the steepness of the particle size distribution is in the range of 1.3-1.55. Such a steepness is indicative of a relatively uniform particle size. This steepness in conjunction with the ultrafineness of the particles allows for transparency of the composition to be maintained better than in compositions with a less steep particle size distribution. In compositions with a less steep particle size distribution, the particles tend to form agglomerates in the binder resulting in a decrease in transparency, in other words an increase in opacity.

In an embodiment, the composition further comprises one or more conventional additives. In a further embodiment, the one or more conventional additives are selected from the group consisting of thickeners, bases, dispersants, coalescing agents, antifoaming agents, wetting agents, viscosity modifiers, film-forming agents, biocides and binders. Each additive bestows one or more particular properties on the composition, e.g. biocides render the composition and coatings formed therefrom less susceptible to attack from microbes.

In one embodiment, the binder is selected from the group consisting of lacquer, styrene acrylic-based lacquer, acrylic-based lacquer, polyurethane-based lacquer and water-based wood oil. Each binder provides different properties e.g. when a particular application requires that the varnish composition should have particularly good water vapour permeability, a styrene acrylic based lacquer is preferred over a polyurethane-based lacquer. If the varnish composition is to be used in an application that must provide a particularly hard coating, a polyurethane lacquer is preferable to an acrylic-based lacquer which is in turn preferable to a styrene acrylic-based lacquer. Best film blocking is provided from a composition comprising a polyurethane lacquer, which is slightly better than an acrylic-based lacquer, which is slightly better than a styrene acrylic-based lacquer. In situations where low water absorption is imperative, a polyurethane lacquer is better than an acrylic-based lacquer, which is better than a styrene-acrylic based lacquer.

In a particular embodiment the composition comprises 10 to 30 wt % precipitated calcium carbonate particles by weight of the composition, preferably 15 to 25 wt % precipitated calcium carbonate, particles, suitably 10 wt %, particularly 20 wt %, exemplarily 30 wt % precipitated calcium carbonate particles by weight of the composition. The amount of precipitated calcium carbonate particles may be adjusted depending on the properties required from the composition e.g. film blocking tends to increase as the proportion of UFPCC in the composition increases, but even low doses of UFPCC improve film blocking. Water swelling and water absorption tend to decrease as the proportion of UFPCC in the composition increases. Lacquers containing UFPCC absorb less water and swell less, while in turn water vapour transmission through the lacquer is higher meaning that lacquer is more permeable to water vapour. Water vapour permeability increases as the dose of UFPCC increases. Film hardness of coatings provided by such compositions also tends to increase as the amount of UFPCC in the composition increases, while the transparency of coatings formed from varnish compositions according to embodiments of the invention is maintained even at high doses of UFPCC.

In a further embodiment the precipitated calcium carbonate particles have an average $D_{50}$ particle size of 70-90 nm, particularly 75 nm, suitably 80, most suitably 90 nm.

Further embodiments relate to a film coating. In one embodiment the film coating is formed from a transparent varnish composition comprising a binder, and precipitated calcium carbonate. The coating has one or more of the following properties: a gloss value measured at 20° from the vertical using a gloss meter of about 1 to 60 gloss units, a gloss value measured at 60° from the vertical using a gloss meter of about 5 to 85 gloss units, a gloss value measured at 85° from the vertical using a gloss meter of about 30 to 100 gloss units. By means of the invention it can be seen that the addition of precipitated calcium carbonate particles as described herein, including UFPCC, has a matting effect on the coating and creates a smooth surface with a soft touch.

In a further embodiment the film coating has a film hardness in the range of 20 to 120, preferably 25 to 103, particularly 33 to 93, suitably 40 to 80. Film hardness is measured using the Konig method. The Konig pendulum comes to rest at a time period in the range of 20 to 120 seconds, preferably 25 to 103 seconds, particularly 33 to 93 seconds, suitably 40 to 80 seconds.

In one embodiment the coating has a scrub resistance in the range of 0.15% to 0.30%, preferably 0.18% to 0.28%, particularly 0.20 to 0.25%, suitably 0.24%. In the scrub resistance test, the mass of a coated surface is measured, the surface of the coating is stroked with a sponge 600 times. Weight loss is measured and calculated as a percentage. The scrub resistance test shows that in at least some embodiments of the present invention, scrub resistance remains the same even though the amount of binder present in the coating has been reduced.

Film blocking is evaluated visually/manually. Two panels each having a surface coated with a film coating are positioned so that the coated faces contact each other. constant pressure is applied for a period of 1 hour at a given temperature. After a period of 1 hour the panels are detached from one another. Blocking is then rated visually and manually according to the following scheme 10=no signs of attachment, 9=slight signs of attachment, 8=small force is needed to detach the test panels, no permanent damage, 7=one quarter of the film sticks, 6=half of the film sticks, 5=three quarters of the film sticks, 4=the entire film area sticks, 3=one quarter of the test panel is broken, 2=half of the test panel is broken, 1=test panel is totally broken.

In an embodiment the coating has film blocking in the range of 6 to 10.

Further embodiments relate to water absorption and water swelling of the coating. In an embodiment the coating absorbs less than 10 wt % water by weight of the coating, preferably less than 8 wt % water, particularly 6 wt % or less, suitably 3 wt % or less, most preferably 1 wt % or less by weight of the coating.

In a further embodiment, the coating swells in water by less than 20% by volume, preferably less than 10% by volume, particularly 6% by volume or less, suitably 4% by volume or less, for example 3% by volume or less, most preferably 1% by volume or less.

Breathability of coatings or water permeability of coating is important. Transmission of water vapour through coatings according to embodiments of the present invention have been found to be greater than for those of coatings formed of standard lacquers. In one embodiment the coating is permeable to water vapour. In a further embodiment the coating has a water vapour permeability in the range of 131 g/m2/day to 280 g/m2/day, preferably 140 g/m2/day to 270 g/m2/day. In one embodiment the water vapour permeability is measure according to the EN ISO 7783-2 standard.

As mentioned above the addition of UFPCC to binders provides coatings that are more matte than conventional coatings and are smooth and soft to the touch. Thus, in an embodiment the coating is a soft touch coating Coatings of a particular thickness are desirable for both aesthetic and mechanical reasons. In an embodiment the coating has a thickness of ≤150 µm, preferably in the range of 30 µm to 120 µm, suitably 60 µm to 90 µm.

In a further embodiment the film coating has been formed by applying the varnish composition on a surface of a solid substrate, preferably on a surface of a solid substrate selected from the group consisting of plastic, glass, wood, paper, metal, stone, artificial stone, glass fibre, fibre glass and board.

In a still further embodiment, the film coating is formed from the varnish composition of any of the embodiments described hereinabove.

Methods of forming a film coating are described. In one embodiment the method comprises the steps of applying a varnish composition according to any one of the embodiments described hereinabove onto a surface of a solid substrate preferably on a surface of a solid substrate selected from the group consisting of plastic, glass, wood, paper, metal, stone and board, to form a film coating according to any one of the embodiments described hereinabove.

Also disclosed in one embodiment is a transparent varnish composition obtainable by the method according to any of the embodiments described herein.

EXAMPLES

UFPCC was added to three different lacquers with the composition as shown in Table 1. Water is listed twice as in some cases thickeners, e.g. Acrysol, are diluted before addition to avoid them reacting too effectively, which can cause formation of grits or agglomerates. Thus, water would be added with thickeners. Alternatively or additionally, water would be used as "rinsing" water in coatings formulations. The binder used in each of the three compositions was a styrene acrylic binder, an acrylic binder and a polyurethane binder.

UFPCC was added in the ratios lacquer:UFPCC 90:10, 80:20 and 70:30

Table 2 and FIGS. 4A, 4B and 4C show some of the effects of adding UFPCC to the composition comprising styrene-acrylic based lacquer. Transparency of the lacquer has been maintained even with a high (70/30) UFPCC dose.

The effect on the contrast ratio is small. UFPCC has a matting effect on the lacquer which creates a smooth surface with a soft touch.

TABLE 1

Tested clear lacquer formulations.

| Component | Mass/g |
|---|---|
| Water | 362.7 |
| Acticide MBS | 1.5 |
| Binder | 600 |
| Texanol | 16 |
| Acrysol RM2020 | 8.8 |
| Acrysol RM8W | 2.9 |
| Water | 27.3 |
| Ammonia | 0.7 |
| Byk-022 | 0.2 |
| Total | 1020.1 |

TABLE 2

Styrene acrylic-based composition with different UFPCC doses.

| | STD 0% | 90:10 | 80:20 | 70:30 |
|---|---|---|---|---|
| L*D65 | 91.04 | 91.29 | 91.57 | 92.03 |
| a*D65 | −1.04 | −1.04 | −1.04 | −1.04 |
| b*D65 | 4.40 | 4.45 | 4.35 | 4.21 |
| Ry on white | 78.60 | 79.12 | 79.74 | 80.78 |
| Ry on black | 0.80 | 1.36 | 2.40 | 3.52 |
| Contrast ratio | 1.0% | 1.7% | 3.0% | 4.4% |
| (delta)Contrast ratio | — | 0.7% | 2.0% | 3.3% |
| Gloss 20° | 76 | 42 | 13 | 4 |
| Gloss 60° | 93 | 78 | 54 | 34 |
| Gloss 85° | 94 | 93 | 87 | 82 |

Film hardness and scrub resistance of obtained coatings are shown in Tables 3 and 4. UFPCC increases the film hardness in all lacquer types. Even the addition of 10% UFPCC by weight of the composition has a significant impact. Scrub resistance was evaluated with a modified scrub test described above. The test showed that even the highest addition of UFPCC did not have a significant effect on the polyurethane lacquer composition's scrub resistance.

TABLE 3

Film hardness of various compositions.

| Styrene-acrylic based composition | | STD | 90:10 | 80:20 | 70:30 |
|---|---|---|---|---|---|
| Hardness (seconds) | 1 day | 21 | 25 | 27 | 33 |
| | 7 days | 28 | 33 | 38 | 45 |
| | 20 days | 37 | 46 | 52 | 56 |
| Acrylic-based composition | | STD | 90:10 | 80:20 | 70:30 |
| Hardness (Seconds) | 1 day | 52 | 54 | 56 | 60 |
| | 7 days | 62 | 66 | 72 | 77 |
| | 20 days | 72 | 76 | 84 | 93 |

TABLE 3-continued

Film hardness of various compositions.

| Polyurethane-based composition | | STD | 90:10 | 80:20 | 70:30 |
|---|---|---|---|---|---|
| Hardness (Seconds) | 1 day | 43 | 43 | 42 | 42 |
| | 7 days | 80 | 84 | 85 | 93 |
| | 20 days | 86 | 101 | 101 | 103 |

TABLE 4

Comparison of scrub resistance of standard polyurethane lacquer with polyurethane-based composition with 30 wt % UFPCC.

| Polyurethane-based composition | STD | 70:30 |
|---|---|---|
| mass before (g) | 27.592 | 28.192 |
| weight after (g) | 27.538 | 28.125 |
| weight loss (g) | 0.05 | 0.067 |
| weight loss (%) | 0.20 | 0.24 |

The addition of UFPCC to lacquers also improved the film blocking of each composition as shown in Table 5. Even low doses of UFPCC prevented damage both at room temperature (23° C.) and at elevated temperature (50° C.).

TABLE 5

Film blocking of various compositions.

| Styrene acrylic-based composition | STD | 90:10 | 80:20 | 70:30 |
|---|---|---|---|---|
| 1 hour 23° C. | 4 | 8 | 8 | 9 |
| 1 hour 50° C. | NA | NA | NA | NA |
| Acrylic-based composition | STD | 90:10 | 80:20 | 70:30 |
| 1 hour 23° C. | 9 | 10 | 10 | 10 |
| 1 hour 50° C. | 5 | 9 | 9 | 9 |
| Polyurethane-based composition | STD | 90:10 | 80:20 | 70:30 |
| 1 hour 23° C. | 10 | 10 | 10 | 10 |
| 1 hour 50° C. | 5 | 9 | 10 | 10 |

Table 6 shows that compositions containing UFPCC absorb less water than an swell less in water than compositions without UFPCC.

TABLE 6

Water swelling and absorption of various compositions

| Styrene acrylic-based composition | STD | 90:10 | 80:20 | 70:30 |
|---|---|---|---|---|
| Water absorption (wt %) | 25.8 | 8.0 | 6.2 | 6.0 |
| Swelling in water (vol %) | 20.4 | 9.4 | 7.3 | 6.0 |

TABLE 6-continued

Water swelling and absorption of various compositions

| Acrylic-based composition | STD | 90:10 | 80:20 | 70:30 |
|---|---|---|---|---|
| Water absorption (wt %) | 10.1 | 8.0 | 4.1 | 3.0 |
| Swelling in water (vol %) | 7.3 | 5.2 | 4.1 | 1.0 |
| Polyurethane-based composition | STD | 90:10 | 80:20 | 70:30 |
| Water absorption (wt %) | 4.2 | 3.4 | 3.1 | 3.0 |
| Swelling in water (vol %) | 4.2 | 3.1 | 1.0 | 1.0 |

Table 7 shows the water vapour permeability measured in g/m2/day of styrene acrylic-based compositions and polyurethane-based compositions. Water vapour transmission of compositions comprising UFPCC is higher than those without UFPCC. Therefore breathability is better.

| Styrene acrylic-based composition days | STD | 90:10 | 80:20 | 70:30 |
|---|---|---|---|---|
| 1 | 175 | 195 | 218 | 276 |
| 2 | 157 | 189 | 213 | 267 |
| 3 | 152 | 186 | 210 | 262 |
| 4 | 149 | 185 | 210 | 261 |
| average | 158 | 189 | 213 | 266 |
| Polyurethane-based composition days | STD | 90:10 | 80:20 | 70:30 |
| 1 | 141 | 142 | 168 | 197 |
| 2 | 133 | 136 | 166 | 199 |
| 3 | 134 | 134 | 165 | 199 |
| 4 | 134 | 132 | 163 | 197 |
| 7 | 130 | 131 | 163 | 196 |
| average | 134 | 135 | 165 | 198 |

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the coatings industry. It has been found that ultrafine PCC can be used as a transparent filler in lacquers providing transparent varnish compositions with maintained transparency. The varnishes make harder films with less water absorption and swelling. The films are more permeable to water vapour and are thus more breathable. Film blocking is improved significantly. The films provided are both aesthetically and mechanically pleasing being matt with a soft touch. Embodiments of the present invention are of great interest commercially as replacing binder in clear lacquer compositions with UFPCC provides great savings economically.

The invention claimed is:

1. A method of preparing a transparent varnish composition comprising the steps of:
   providing a binder;
   adding to the binder 1 to 40 wt % precipitated calcium carbonate particles by weight of the composition, wherein:
   the precipitated calcium carbonate particles have an average $D_{50}$ particle size of 60 to 120 nm, measured by dynamic light scattering, fewer than 10% of the precipitated calcium carbonate particles by volume of the total precipitated calcium carbonate particles have a particle size of 75 nm or less, fewer than 10% of the precipitated calcium carbonate particles by volume of the total precipitated calcium carbonate particles have a particle size of 110 nm or more, and the steepness of the particle size distribution of the precipitated calcium carbonate particles is in the range of 1.3-1.55, and dispersing the precipitated calcium carbonate in the composition.

2. A transparent varnish composition comprising:

a binder, and 1 to 40 wt % by weight of the composition of precipitated calcium carbonate particles dispersed in the binder, wherein the precipitated calcium carbonate particles have an average $D_{50}$ particle size of 60 to 120 nm, measured by dynamic light scattering, wherein fewer than 10% of the precipitated calcium carbonate particles by volume of the total precipitated calcium carbonate particles have a particle size of 75 nm or less, fewer than 10% of the precipitated calcium carbonate particles by volume of the total precipitated calcium carbonate particles have a particle size of 110 nm or more, and wherein the steepness of the particle size distribution of the precipitated calcium carbonate particles is in the range of 1.3-1.55.

3. The composition according to claim 2, further comprising one or more conventional additives, wherein the one or more conventional additives are selected from the group consisting of thickeners, bases, dispersants, coalescing agents, antifoaming agents, wetting agents, viscosity modifiers, film-forming agents, biocides and binders.

4. The composition according to claim 2, wherein the binder is selected from the group consisting of lacquer, styrene acrylic-based lacquer, acrylic-based lacquer, polyurethane-based lacquer, and water-based wood oil.

5. The composition according to claim 2, wherein the composition comprises 10 to 30 wt % of the precipitated calcium carbonate particles, by weight of the composition.

6. The composition according to claim 2, wherein the precipitated calcium carbonate particles have an average $D_{50}$ particle size of 70-90 nm.

7. A film coating formed from the transparent varnish composition of claim 1, wherein the film coating has one or more of the following gloss values:

a gloss value measured at 20° from the vertical using a gloss meter of about 1 to 60 gloss units, a gloss value measured at 60° from the vertical using a gloss meter of about 5 to 85 gloss units, or a gloss value measured at 85° from the vertical using a gloss meter of about 30 to 100 gloss units.

8. The film coating according to claim 7, wherein the film coating has a film hardness in the range of 20 to 120.

9. The film coating according to claim 7, wherein the film coating has a scrub resistance in the range of 0.15% to 0.30%.

10. The film coating according to claim 7, wherein the film coating has a film blocking in the range of 6 to 10.

11. The film coating according to claim 7, wherein the film coating absorbs less than 10 wt % water by weight of the coating.

12. The film coating according to claim 7, wherein the film coating swells in water by less than 20% by volume.

13. The film coating according to claim 7, wherein the film coating is permeable to water vapour.

14. The film coating according to claim 7, wherein the film coating has a water vapour permeability in the range of 131 $g/m^2/day$ to 280 $g/m^2/day$.

15. The film coating according to claim 7, wherein the film coating has a thickness of ≤150 μm.

16. A method of forming a film coating on a substrate comprising the steps of:

applying a varnish composition according to claim 2 onto a surface of a solid substrate selected from the group consisting of plastic, glass, wood, paper, metal, stone and board, to form a film coating on the solid substrate.

17. The composition according to claim 2, wherein the precipitated calcium carbonate particles have an average $D_{50}$ particle size of 80-90 nm.

18. The composition according to claim 2, wherein the composition comprises 15 to 25 wt % of the precipitated calcium carbonate particles, by weight of the composition.

19. The composition according to claim 2, wherein the precipitated calcium carbonate particles are thermochemically dispersed in the binder.

20. The composition according to claim 2, wherein the composition is a transparent composition which allows light transmission of >90% of visible light.

21. The composition according to claim 2, wherein:

10% by volume of the precipitated calcium carbonate particles have a particle size of less than 66.74 nm;

50% by volume of the precipitated calcium carbonate particles have a particle size of less than 80.09 nm; and 90% by volume of the precipitated calcium carbonate particles have a particle size of less than 96.21 nm.

22. The composition according to claim 2, wherein:

10% by volume of the precipitated calcium carbonate particles have a particle size of less than 72.8 nm;

50% by volume of the precipitated calcium carbonate particles have a particle size of less than 87.31 nm; and 90% by volume of the precipitated calcium carbonate particles have a particle size of less than 104.71 nm.

* * * * *